(No Model.) 8 Sheets—Sheet 1.

W. CAREY.
MACHINE FOR UNITING SOLES AND UPPERS OF BOOTS OR SHOES.

No. 536,183. Patented Mar. 26, 1895.

Witnesses

Inventor
William Carey
By his Attorney (No Model.) 8 Sheets—Sheet 2.

W. CAREY.
MACHINE FOR UNITING SOLES AND UPPERS OF BOOTS OR SHOES.

No. 536,183. Patented Mar. 26, 1895.

Fig. 9

Witnesses

Inventor
William Carey
By his Attorney

(No Model.) 8 Sheets—Sheet 4.

W. CAREY.
MACHINE FOR UNITING SOLES AND UPPERS OF BOOTS OR SHOES.

No. 536,183. Patented Mar. 26, 1895.

Witnesses Inventor
William Carey
By his Attorney

(No Model.) 8 Sheets—Sheet 6.
W. CAREY.
MACHINE FOR UNITING SOLES AND UPPERS OF BOOTS OR SHOES.

No. 536,183. Patented Mar. 26, 1895.

(No Model.)  8 Sheets—Sheet 8.

W. CAREY.
MACHINE FOR UNITING SOLES AND UPPERS OF BOOTS OR SHOES.

No. 536,183. Patented Mar. 26, 1895.

UNITED STATES PATENT OFFICE.

WILLIAM CAREY, OF MONTREAL, CANADA, ASSIGNOR TO THE CAREY WIRE SEWING PROCESS COMPANY, OF PORTLAND, MAINE.

MACHINE FOR UNITING SOLES AND UPPERS OF BOOTS OR SHOES.

SPECIFICATION forming part of Letters Patent No. 536,183, dated March 26, 1895.

Application filed February 20, 1894. Serial No. 500,934. (No model.) Patented in Canada November 25, 1893, No. 44,772.

*To all whom it may concern:*

Be it known that I, WILLIAM CAREY, of the city of Montreal, in the District of Montreal and Province of Quebec, Canada, have invented certain new and useful Improvements in Machines for Uniting the Soles and Uppers of Boots or Shoes, (on which I have obtained Letters Patent of Canada, No. 44,772, granted November 25, 1893;) and I do hereby declare that the following is a full, clear, and exact description of the same.

This invention relates to that class of machines principally used for securing together the soles and uppers of boots and shoes or for attaching the uppers thereof and stitching harness, belting and the like, by a seam composed of a continuous thread or wire in loops and short lengths of wire or other like material inserted in same.

The objects of the invention are to provide improved means for producing a union which shall not require a complete perforation of the two or more substances or parts to be secured, to avoid the necessity of preparing the short lengths of wire in any way, such as bending, &c., previous to their insertion, and to do away with the necessity of turning the boot or shoe inside out and of channeling the sole.

The several improvements include various novel combinations and constructions of parts hereinafter described and particularly pointed out in the claims, whereby a better running of such machines on the whole is secured, together with a more ready adjustment and replacement of the various parts thereof, the more particular specific features being:—an improved feed device for the stock; an improved adjustment of such feed device; an improved loop inserted; an improved carrier for the loop inserter; adjustable ways for the loop inserter crosshead for the purpose of taking up the wear thereof; an improvement in the mechanism for regulating the adjustment of the loop inserter; an improved adjustment for the presser foot; an improved adjustment for the "combined awl and nail-driver;" and an improvement in the mechanism for supplying the stitch locking pieces to the "combined awl and nail driver."

Such mechanism I will now describe in detail, and for full comprehension of the same, reference must be had to the annexed drawings, forming a part of this specification, in which—

Fig. 23 is a vertical section on line *x x* Fig. 22. Fig. 23ᵃ is a front elevation of the base of head section partly broken away and detachable front piece removed. Fig. 27, a horizontal section on line *y y* Fig. 24; Fig. 28, a face view of the head of the machine with front plate removed, and Fig. 29 a vertical section on line *x x* Fig. 28, Fig. 30 being a plan view of the cross head or carrier for the loop inserter, and Fig. 31 a longitudinal vertical section of such carrier on line 1, 1, Fig. 30, Fig. 32 being a detail sectional view of the operating segment for the carrier of the loop inserter.

Similar letters of reference indicate like parts.

A is the main frame of the machine in the form of a hollow tapering pedestal or column having an extension A', with an opening A² in it, and arm A³ extending from its front, also carrying on its upper end a top plate a' perforated to accommodate a vertical shaft and forming a base for a head section A⁴ also perforated to form a bearing for the vertical shaft and cut away to accommodate cams on the same, and terminating in a goose-head A⁵, which is in line with the extension A' and arm A³.

B is the horn, hollow and provided with a vertical sleeve B', projecting from the inner end of its horizontal portion down through the upper part of the extension A', which forms a bearing for it. To insure a steady vertical alignment throughout the sidewise rotation or swinging movement of the horn, an arm B² from the upper side of its horizontal portion is pivoted to the arm A³ in the axial line (indicated in Fig. 2) of the sleeve B'. In the nose of the horn is arranged the loop-inserter, and this, with the presser-foot carried by the goose-head A⁵, works vertically in the axial line of the sleeve B', the presser-foot offering the necessary resistance to the action of the loop-inserter and awl and in this respect fulfilling a function of the usual work-table.

C is the loop-inserter with inserting portion proper (shown in detail in Fig. 8) preferably of an oval form in cross section for strengthening purposes, grooved at its upper end partially down one side or edge and fully down the other to carry the continuous thread of uniting material, and having a circular base $c$ with central perforation $c'$ in line with the groove extending the full length of the loop inserter, and annular peripheral flange $c^2$, the flat inserting portion proper C being arranged eccentrically of such base so as to allow of such central perforating of the base through which the thread of uniting material passes up to the inserting portion.

Figures 1, 2:
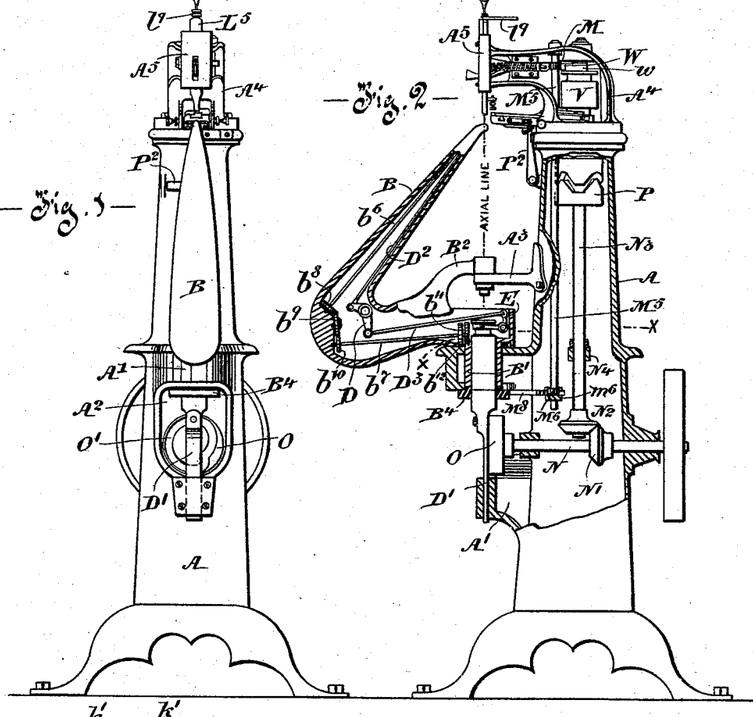
Figure 1 is a front view of the machine, showing the swinging horn in a central position.
Fig. 2, a part vertical elevation and sectional view of same, taken at right angles to Fig. 1.

The flange $c^2$ on the base of the loop inserter fits a horizontal groove $c^3$ (a part of which presents substantially the arc of a circle concentric with such base and the other parts lead to an opening in one side) formed in the inner side of an upwardly projecting wall or ridge $c^4$ extending partially around the top of a movable cross head C' working in vertical guides C² on the inner sides of the nose of the horn (shown in Figs. 3 and 4) the base of the loop inserter being slid sidewise into place through the opening left in the side of the wall $c^4$ and then secured in place by means of a pin $c^5$ inserted in a horizontal passage through the wall $c^4$ in front of the base $c$. This arrangement allows the cross head to be rotated with the horn about the base of the loop inserter without any chance of altering the vertical position of the inserter in any way relatively to the cross head while the use of the flange $c^2$ and groove $c^3$ secures solid bearings against upward and downward pressure upon the loop inserter. Vertical reciprocating movement is imparted to this cross-head C' preferably by cam mechanism, together with a vertical sliding bar D' extending vertically across the opening A² in the extension of the frame, working in the sleeve B' of the horn, and a guide in the lower part of such extension, a screw in such bar, all to be more fully described, and bell-crank levers D and E, a geared segment $d'$ and connecting rods D² D³, these latter arranged within the horn and connected as shown in Figs. 2 and 4, the connection between the geared segment $d'$ and the cross head C' being by means of a projection $d^2$ from the segment $d'$ fitting within a recess $d^3$ in the body of the cross head.

Figures 3, 7:
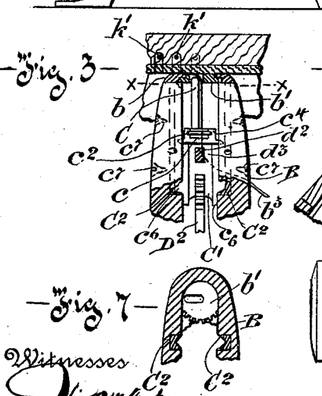
Figs. 3, 4 and 5, detail views of the nose of the horn and mechanism arranged therein for introducing the continuous thread.
Fig. 7, a horizontal section on line *x x* Fig. 3, looking up.
Figures 4, 5, 6, 8:
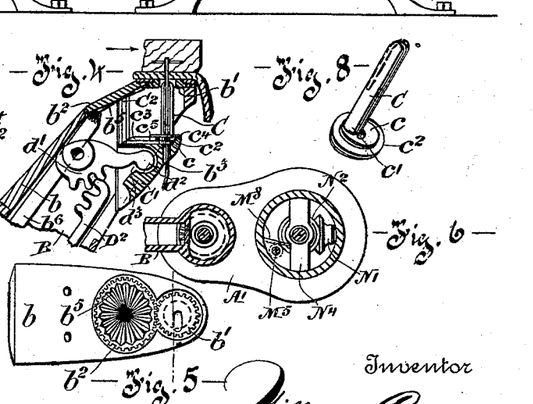
Fig. 6, a horizontal section of machine on line *x x* Fig. 2.
Fig. 8, a detail perspective view of loop-inserter.

Fig. 3 is a section taken through portions of two substances (in the present case) resting on the nose of the horn and also through a portion of such horn (the cap of which is broken away) on the line of the union, the view being in the direction indicated by the arrow in Fig. 4 and as it is necessary for the loop-inserter C, not being round, but flat, to be kept always in a line at right angles to the forward movement of the awl whatever may be the position of the horn (which right-angle line will be as indicated by the dotted line, Fig. 5) the mechanism hereinafter described is used to retain the loop-inserter in such position.

The upper surface of the nose of the horn is composed of a cap or plate $b$, conforming to the usual contour of such nose, screwed in place and having two circular openings, whose axes are in line with the longitudinal axis of the horn and with interior annular recesses in the plate encircling them, in which fit, so that their exteriors will be flush with the exterior of the plate, two geared disks $b'$ $b^2$, the former having an eccentric slot parallel with the dotted line shown in Fig. 5, up into which the end of the loop inserter C projects, and through it works to drive the continuous thread $b^3$ in a loop into the substances, as shown in Fig. 3, the slot being long enough to accommodate the thread at one side of the loop inserter, and the disk $b^2$ having on its interior face radial teeth $b^5$ with which meshes a bevel-pinion on the end of a shaft $b^6$ (the upper end of which has a bearing in the hollowed upper surface of the segment $d'$) running down the horn, and by means of another shaft $b^7$ and other gears $b^8$, $b^9$, $b^{10}$, $b^{11}$, so as to communicate with an annular rack $b^{12}$ on the extension A' encircling the sleeve, B', of the horn. These disks $b'$ $b^2$ are held in place simply by confinement between the plate $b$ and the body of the horn, and are in mesh with each other and free to be rotated in such bearing. By such means and the flange and groove connection of the loop inserter with the cross-head C' the loop inserter whether the horn be turned to right or left, will not turn, as the gear $b^{11}$, being rotated by traveling along the rack $b^{12}$, transmits motion through the system of shafts and gears to give a rotation to the gear $b^2$ in the same direction as that of the nose of the horn, and so counteracts any rotation that $b'$ would have with it and the cross head C', the groove $c^3$ of this latter simply working on the flange $c^2$ of the base $c$ of the loop-inserter, and so allowing it to remain substantially in the same position.

The vertical guides $C^2$ for the cross head carrying the loop inserter are made in the form of adjustable blocks or strips let into squared vertical recesses on the inner sides of the nose of the horn and having dove-tailed ways formed in their faces to receive the angular ribs $c^6$ on the sides of the cross-head, the adjustment of the guides being secured by screws $c^7$ passing through the sides of the horn and bearing against them. This arrangement allows any wear of the guides to be taken up or new ones to be inserted.

The mechanism for adjusting the length of throw of the loop-inserter C will be better understood after the parts connected with the awl and presser-foot mechanism have been described.

Figure 9:
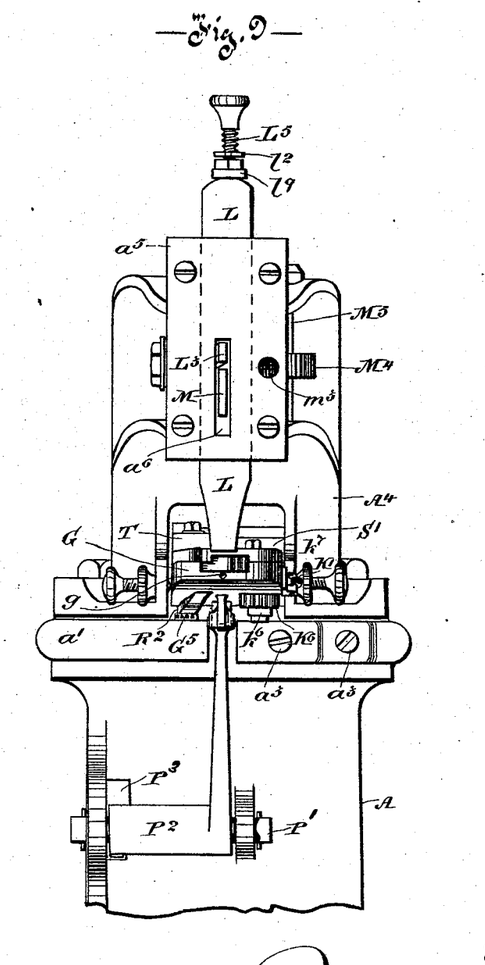
Fig. 9, a detail front view of goose-head and upper portion of body of machine.
Figure 10:
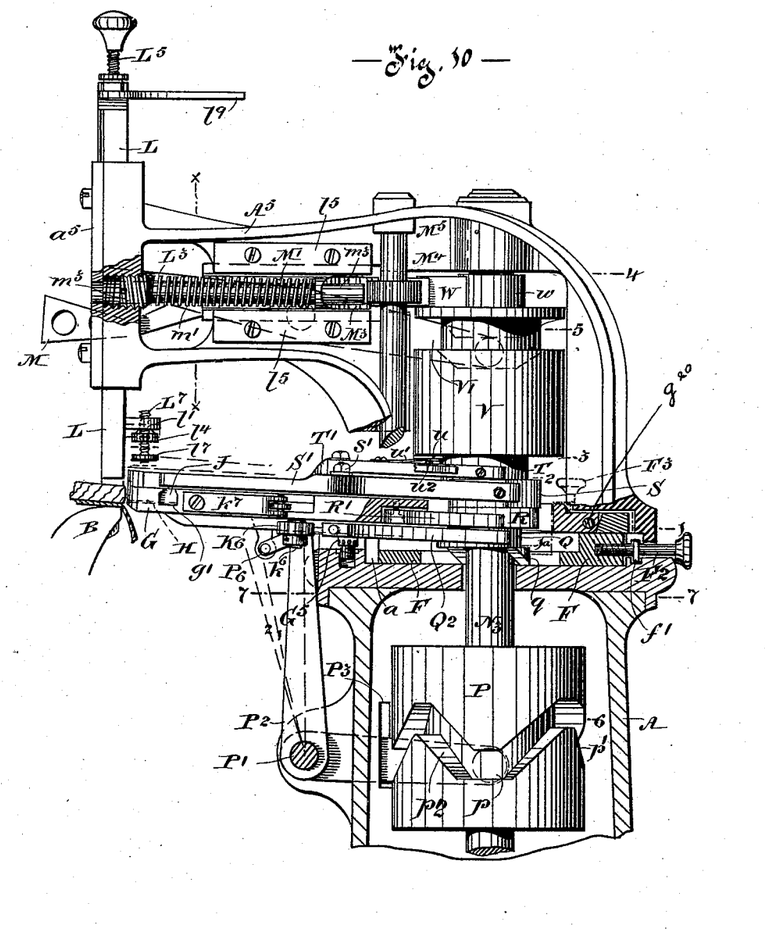
Fig. 10, a part vertical elevation and sectional view of same at right angles to Fig. 9.
Figures 12, 13, 19, 20:
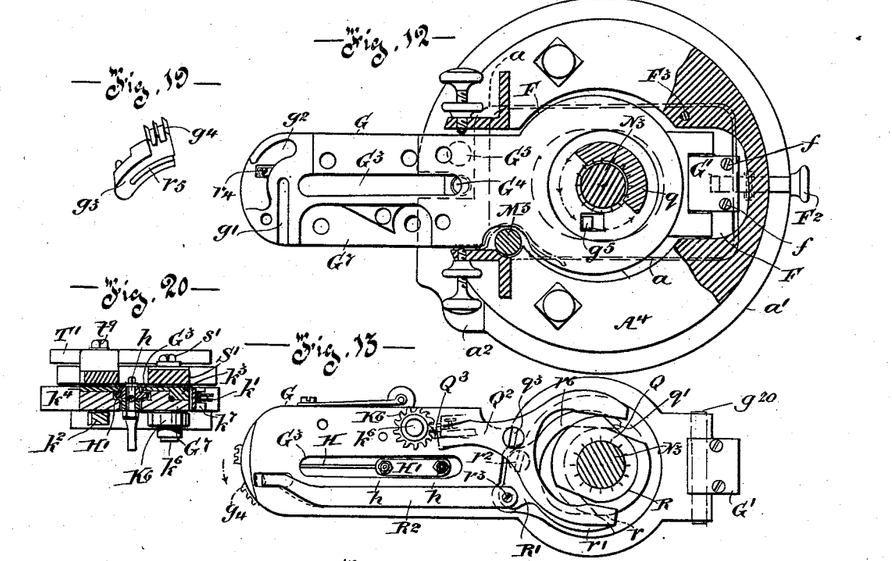
Fig. 12 is a section on line 1—1 Fig. 10, looking down.
Fig. 13 a section on line 1ᵃ Fig. 10 looking up.
Fig. 19 is an enlarged detail view of feed foot.
Figs. 20 and 21 are cross sections of front part of awl carrier on lines *x x z z*, Fig. 15.
Figure 14:
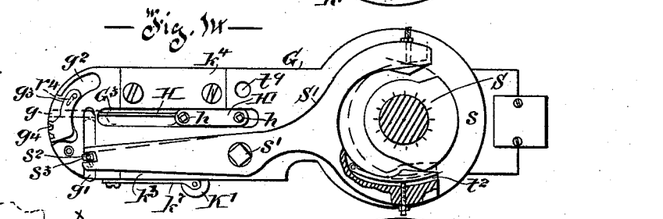

In an oblong recess $a$ in the top plate $a'$ (see Figs. 10 and 12) is arranged a slide F, corresponding in shape and depth to the recess, so as to be flush with the top plate, but shorter in length, and having a central opening for cams, mounted on the vertical shaft referred to and to be hereinafter described, to work in. To this slide toward the rear is attached by screws $ff$ the section G' of a hinged carrier formed of two sections G G', $g^{20}$ being the hinger-pin. The head-section $A^4$ of the machine is cut away at its base and front to accommodate the section G of this carrier, which is also formed with an opening to accommodate cams on the vertical shaft, and projects out through the front of such head-section toward the nose of the horn, and is preferably normally held in an inclined position by an adjustable screw $G^5$ with perforated head, arranged in the top plate $a'$ near the front, as shown in Figs. 9, 10 and 12. The awl H of the machine is arranged in this carrier, and, as shown in Figs. 13, 14, 15 and 20 is secured by screws $h$ in a cross-head H' located in a longitudinal slot $G^3$ in the forward end of carrier G and adapted to receive a reciprocating motion from mechanism to be hereinafter described. The nose of carrier G is perforated, as shown at $g$ Fig 14, for the passage of the awl, and in a groove $g'$ at right angles to this perforation a slide J, with a channel $j$ parallel with the perforation is arranged to work and serve to cut the short lengths of wire to be inserted by the awl H from a continuous strand fed into channel $j$ from feeding mechanism at certain intervals through another channel to be described, and also to locate them in a position in front of the awl, as will be explained in the operation of the machine.

Figure 15:
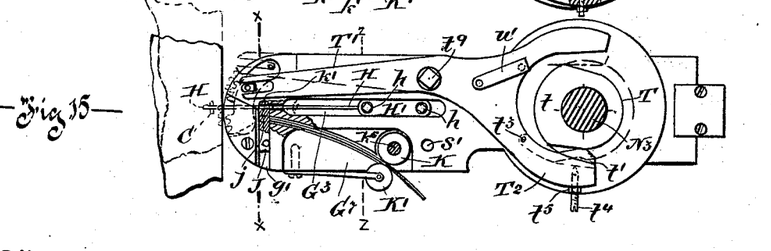

K K' are two horizontal disks with serrated peripheral grooves, as shown in Figs. 15 and 20, for feeding the continuous strand $k$ from which the short strips $k'$ as shown in Fig. 15 are cut, into the channel $k^2$ in the interior of the forward end of the carrier and leading to channel $j$ of the slide J. The channel $k^2$ and recesses for the disks K K' are formed in the upper surface of a portion $G^7$ of the carrier about half its thickness, (see Fig. 20) and by means of plates $k^3$ $k^4$ the carrier is evened up to the full thickness. This construction is also convenient for providing the proper guideways for the cross-head H'. The disk K is keyed on a spindle $k^6$, passing completely through the carrier and having mounted on its lower end a ratchet $K^6$ to be operated as will be described farther on, and K' is pivoted in the free end of a spring holder $k^7$ screwed to the side of the carrier, by which the necesssary friction is secured for feeding various sizes of wire and compensating for any wear.

Referring now to Figs. 9, 10, 11, 16, 28 and 29, L is the presser-foot bar, secured in place in a vertical channel in the goose-head $A^5$ by face-plate $a^5$, having slot $a^6$ and adapted to work vertically in such head above and in line with the loop-inserter C.

Figures 23, 23A, 28, 29:
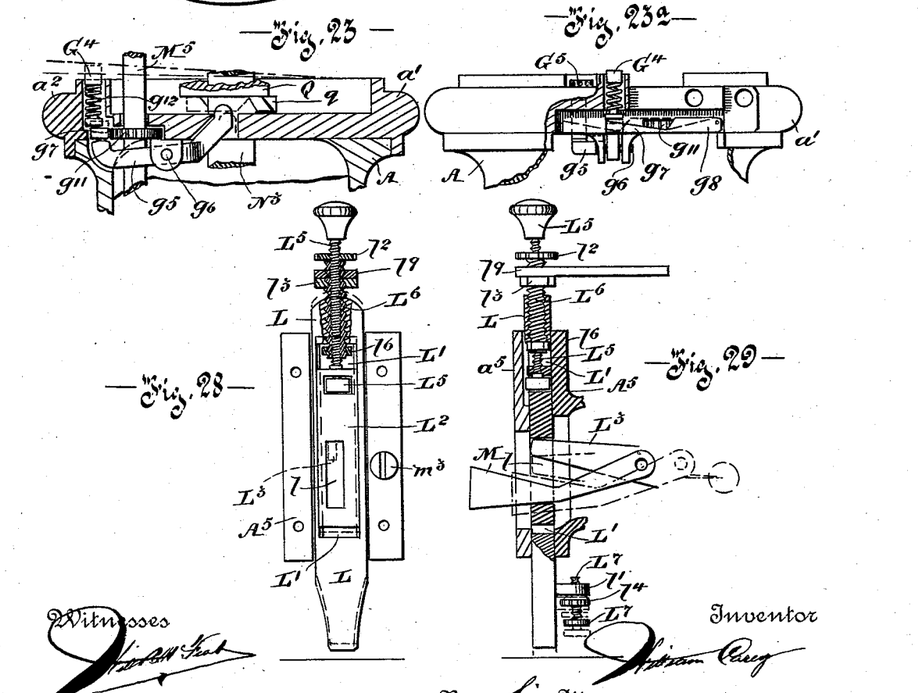

L' indicates a longitudinal slot in the central portion of bar L, in which slot is adjustably fitted a slide $L^2$. This slide has a slot $l$, into which projects the ends of the operating-lever $L^3$, and an adjusting wedge-piece M, to be more particularly described, and has the lower end of a vertical male adjusting screw $L^5$ threaded in a female screw $L^6$, working through the upper portion of the bar L, connected with its upper end, as shown in Figs. 28 and 29, a handle $l^7$, being adjustably secured to the top of the female screw $L^6$ by jam nut $l^3$ whereby upon the rotation of such handle and the screw $L^6$ the presser foot bar is moved up or down and another vertical adjusting-screw $L^7$ is arranged to work in a bracket $l'$, projecting from the back side of bar L in a line over the forward end of carrier G and come in contact with same and each of said screws being provided with the respective jam nuts $l^2$, $l^6$, $l^4$ and acting as mentioned farther on, the screw $L^6$ of course having the jam nut $l^3$ before mentioned, in addition.

Figures 11, 17, 18, 25:
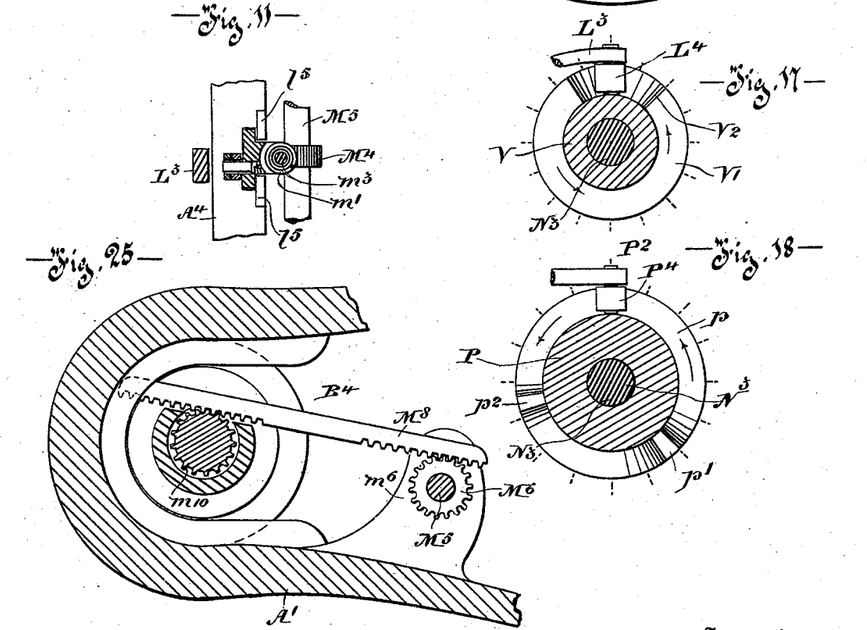
Fig. 11, a section on line *x x* Fig. 10.
Figs. 14, 15, 16, 17, and 18 are sections respectively on lines 2, 3, 4, 5 and 6, Fig. 10.
Fig. 25 is a horizontal section on line *z z* Fig. 24, showing a portion of such adjusting mechanism in plan view.
Figure 16:
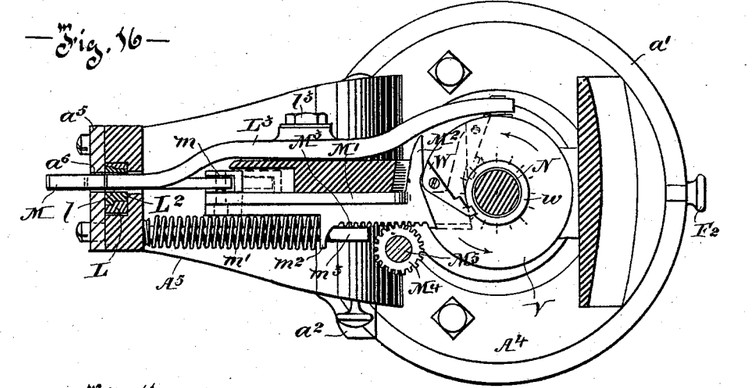
Figure 21:
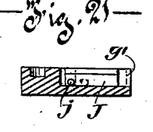
Figure 22:
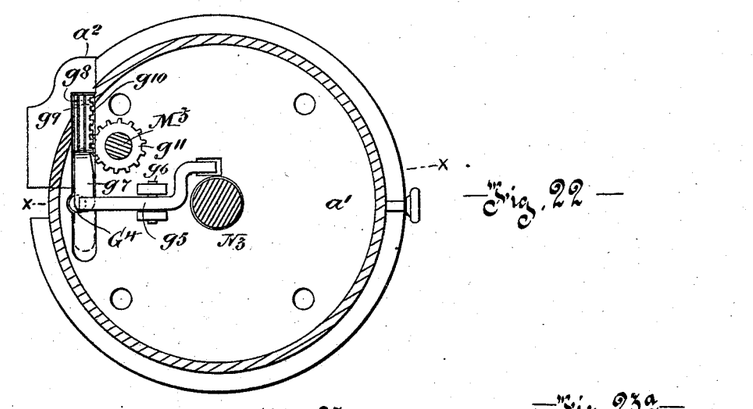
Fig. 22 is a horizontal section on line 7—7 Fig. 10, looking up.

In a horizontal groove in the web of the head-section about level with the slot $l$ in slide $L^2$ when the presser foot is in its raised position, as in Fig. 10, is arranged to work a slide M', to the forward end of which the wedge-piece M is pivoted at $m$, retaining plates $l^5$ secured to the edges of the groove holding it in place. This slide is grooved almost from end to end to accommodate a coiled expansion-spring $m'$, as shown in Figs. 11 and 16 one end of which bears against the rear face of the front portion of the goose head $A^5$, and the other bears against a lateral projection $m^2$ from the outer face of the slide, so as to keep a bearing-surface $M^2$, projecting at right angles thereto, pressed against an operating-cam to be presently described with several others, an adjustable localizing pin $m^3$ for the spring $m'$ being screwed into the front portion of the goose head and extended rearward and freely through an aperture in the projection $m^2$. A rack $M^3$ is formed on the face of the slide for about half its length from the rear end, with which meshes a pinion $M^4$, mounted on a vertical shaft $M^5$, extending from a bearing in top of the head-section down through aperture in the carrier G, slide F, and top plate $a'$ to and through the bearing $m^6$, situated in the interior of the pedestal A about level with the collar $B^4$ and on its lower end above such bearing is fixed a pinion $M^6$.

D' is the vertical sliding bar previously mentioned in relation to the loop inserter C, having its upper portion, which works in the sleeve B' of the horn, hollow and screw-threaded to receive the screw $M^7$, provided with a head $m^7$ and neck $m^8$, projecting above the top of the bar, the latter, as shown in Fig. 27, being partially encircled loosely by the collar-segments E', pivoted to the ends of the forked bell-crank lever E pivoted in the horn. Gear teeth $m^{10}$ are cut in the screw $M^7$ near its lower end, and a toothed rack $M^8$ supported in a groove in the side of the collar $B^4$ next the bottom of the extension A' and on the bracket $m^6$, has one end in mesh with such teeth $m^{10}$ and the other in mesh with the pinion $M^6$ on the shaft $M^5$ by which arrangement the adjusting mechanism of the presser-bar is connected with that of the loop inserter and a unison of operation, to be described effected.

In a lateral curved recess or runway $g^2$ in the top of the forward end of carrier G is arranged a feed foot $g^3$ in the form of a curved block with teeth or serrations $g^4$ on one side adapted to come in contact with the stock on the horn and feed same as will be hereinafter described.

A lever $g^5$ is pivoted at $g^6$ to the under side of the top plate $a'$ and has its outer end arranged to bear upward against the under side of a slide located in a runway formed in the bottom of the top plate $a'$ and resting on the top of the frame A, the top plate having a detachable part $a^2$ held in place by screws $a^3$, to allow of easy access to such slide. This slide is formed in two parts one of which $g^7$, is in wedge form and pivoted at $g^8$ to the other part $g^9$ which is channeled to receive a portion of the other and has gear teeth $g^{10}$ on one of its sides. The toothed portion of the slide intermeshes with a pinion $g^{11}$ on the shaft $M^5$ and the wedge portion supports an intermediate pusher $G^4$ preferably formed of a coiled spring $g^{12}$ with suitable bearing end pieces and working in a vertical opening in the top plate $a'$, the upper end of such pusher bearing against the under side of the carrier G and acting with the other parts in adjusting same as will be more fully explained in the operation of the machine.

It now remains to explain the mechanism for operating the parts just described and the complete operation of the machine.

N is the driving-shaft, carried in suitable bearings horizontally through the frame A at a height which brings its front end opposite the center of the opening $A^2$, and having mounted on its rear end the driving-pulley, on its front a disk O for operating the loop inserter, and having a cam shaped groove O' in its face, in which fits a roller $O^2$, carried by sliding bar D' and about midway, a bevel-gear N', intermeshing with a similar one $N^2$ on the end of a vertical counter-shaft $N^3$ extending up through a lower bearing $N^4$ in the pedestal to an upper one formed in the top of the head-section $A^4$.

P is a cam-roller (for operating the awl) keyed on shaft $N^3$ just below top plate $a'$, having a peripheral groove $p$ on it, containing a high "rise" $p'$ and a lower "rise" $p^2$.

On a spindle P', carried in projections from the front of the pedestal, is mounted a bell-crank lever $P^2$, with one arm projecting horizontally through a slot $P^3$ in the pedestal and carrying at its end a roller $P^4$ to fit the groove $p$ in such cam-roller P, and its other arm extending vertically up toward the carrier G and having its end connected with the cross head H' by a link $P^6$ pivoted to the downwardly projecting lug of such cross head and to the end of such vertical arm.

Proceeding upward, the first, Q, of a series of cams above the top plate on the shaft $N^3$ is for operating the mechanism used to elevate the awl carrier G, and operating the mechanism for feeding the continuous strand of wire $k$, its contour being shown in Figs. 10 and 13. The cam Q also operates the mechanism for feeding the continuous strand of wire $k$, before mentioned, by means of a rise $q'$ on its side which imparts a lateral reciprocating movement to the forked end of a lever $Q^2$, above this, one, R, of the shape shown in Fig. 13, also, for securing the engagement and disengagement of the feed foot with the stock; one, S, (of the shape shown in Fig. 14) for operating the slide J which cuts the small pieces of wire from the continuous strand and feeds them to the awl; and another, T, (of the contour shown in Fig. 15) for securing the feeding movement of the feed foot. Above these again is situated a cam grooved roller V, having a peripheral groove V' in it containing a rise $V^2$ for raising the presser-foot bar, whose lever $L^3$ pivoted at $l^3$ to the web of the head section, carries on its inner end a roller $L^4$, which fits such groove and such cam grooved roller also having a downward projection $u$ on its under side for purposes hereinafter mentioned. The uppermost cam W consisting of an angular block screwed to the top of cam V and having one end let into a recess in a collar $w$ intermediate of the cam V and the head of the machine, is that which operates the slide M' to which wedge-piece M is attached, its contour being shown in Fig. 16.

The description of the intermediate connections between the parts first described and those just referred to will be better given in the explanation of the working of the machine and the adjustment of its several parts for accommodating varying sizes of material, with which explanation I will therefore now proceed.

In order that a complete conception of the machine may be had and of the size of the stock or material it is capable of accommodating, it may be as well to say that Fig. 10 is drawn to a scale approximately half full size, and that the two substances indicated on the horn would therefore be about a medium size of the stock in the class to which the particular work of this kind of machine is applicable.

To allow the stock to be placed on the horn conveniently, the nose of the carrier G can be raised by hand to the height shown by dotted lines, Fig. 10 so as to have plenty of space between both noses.

To accommodate a less or greater projection of the edge of the material beyond the nose of the horn, the position of the carrier G must be regulated by hand before the machine is started, as will now be explained, reference being had to Figs. 10 and 12.

A bolt $F^2$ passes through the rear of the top plate and its inner end has a loose screw-threaded connection with the rear of the slide F, the bolt having a rigid collar $f'$ about midway of its length which fits a recess in such top plate to hold it against longitudinal movement and by the rotation of this bolt the necessary adjustment of such carrier is effected, the adjustment (shown in Fig. 12) being what is required by a slight projection of the material, the carrier being moved close to the horn. To firmly set the slide F in any position to which it may be adjusted by the bolt $F^2$ I use a set screw $F^3$ carried vertically in the lower part of head section $A^4$ and being adapted to bear upon and pinch the slide F. For greater or less vertical thickness of material there must be an accommodating and corresponding variation in the depression of the presser-foot, the working position of the carrier G, in which the awl is carried, and the movement of the loop-inserter, in order that the two implements will always work in the required relation to each other, and to effect this adjusting mechanism embracing the wedge-piece M, screw $L^7$, rack-slide $M'$, pinion $M^4$, vertical shaft $M^5$, pinion $g^{11}$, slide $g^7 g^8$ of rack and wedge construction, pusher $G^4$, and screw $M^7$, with connections between them, is used.

The maximum height at which the horizontal awl may work is shown by the inclination of the carrier in chain lines in Fig. 10 and its normal position after the work is placed on the horn is shown in full lines. There is always a fixed working relation or distance between the bottom of the presser foot and the awl which can be regulated or varied when the stock to be worked is extremely thick or thin, by means of the adjusting screw $L^7$. During the working of the machine the screw $L^7$ forms as it were, a fixed part of the presser foot and always depresses the carrier for the distance determined by the extent of downward movement of the presser foot so that any minor differences or gradations in the thickness of a piece of stock are accommodated and the awl inserted always at the same distance from the surface of the stock upon which the presser foot bears.

In the case of a very thin piece of stock the vertical working distance between the awl and the bottom of the presser foot would be diminished by raising the adjusting screw $L^7$ so that the awl would not be lowered to a working position below the stock. In the present case as medium-sized stock is shown in place, it will be necessary to depress the carrier to the position indicated by dotted lines in Fig. 10 and the screw $L^7$ must be adjusted accordingly before the machine is started. If the stuff were very thin the screw $L^7$ would be, as just mentioned, raised accordingly and if very thick the action would be reversed the screw $L^7$ being lowered.

Everything is now in readiness to start, and in order that the relative operations of the several parts may be thoroughly understood it will be well to divide a single rotation of the horizontal and vertical shafts of like speed into the sixteen degrees of movement indicated by radial dashes wherever the shafts show in section and extended at different points when required. Before starting the machine the presser foot L is lowered to a normal working position by giving the handle $l^9$ a complete turn and with it the female screw $L^6$, which latter is held against any longitudinal movement in an upward direction by the jam nut $l^2$, and in a downward direction by the screw $L^5$ having its lower end bearing through the slide $L^2$ upon the lever $L^3$, causes the downward movement of the presser foot to the normal position shown in Figs. 10, 28 and 29. It is to avoid any chances of damage to the loop inserter in the event of the machine being set in operation without any stock in position and the presser foot down that I employ means for securing an extra elevation (shown in dotted lines Fig. 28) of the presser foot when the machine is idle which means consist of the screw $L^6$ and handle $l^9$.

To proceed with the operation of the machine the rotation of the shafts is in the direction indicated by the arrows, and the first degree of movement will cause the rise $r$ of cam R to bear against the arm $r'$ of a curved lever $R'$, which is located and pivoted at $r^2$ in a recess in the under side of the carrier G, and operating the lever $R'$ to throw forward a sliding bar $R^2$ pivotally connected with it at $r^3$ and through such bar, imparting to the feed foot $g^3$ with which its forward end has a sliding connection by means of a projection $r^4$ fitting a groove $r^5$ in the under side of such feed foot, the necessary movement to engage the stock. The first degree of rotation also allows the cam piece W to push outward the rack slide M' and with it the wedge piece M to its fullest extent and with its narrowest part interposed between the bearing end of the lever L³ and the bottom edge of the slot l so as to be in a position to be moved inwardly after the presser foot (which has a free sliding movement in its vertical guides) is allowed to descend and simply rest upon the stock without pressure, by the lowering of the forward end of such lever L³, to the regular depth determined by the position of the slide L² in the presser foot and the invariable downward throw of the lever L³ through the rise in the peripheral groove V' of cam roller V acting on the opposite end, which forward end of the lever is located in the slot l as before mentioned, this action of the lever taking place upon the second degree of rotation.

As the lever L³ has an invariable throw of say three eighths of an inch, and it is required that the movement of the presser foot shall accommodate extreme differences in the thicknesses of separate pieces of stock and stock which may be of an irregular thickness the hand adjustment in the form of the screw L⁵ and slide L² are used to alter the normal position of the presser foot relatively to the horn when extremely thick or thin stock is being sewed while the automatic accommodation of the presser foot to medium differences and irregularities in thickness is secured by the automatically actuated wedge-piece M. The second degree of rotation also secures the feeding forward of the stock by the lateral movement of the feed foot g³ through the rise t on cam T throwing the lever T' pivoted at t⁹ through its forked end to the position shown by dotted lines in Fig. 15 and consequently moving the forward end of such lever in the required direction to impart such lateral movement to the feed foot g³. The lever T' carries on its upper side a projection which is preferably in the form of a bent flat spring u' secured to the lever by a screw at one end and having its other end held in place by a localizing pin u² (see Fig. 10) projecting from its under side into a recess in the lever, this projection being used in connection with the parts for depressing the carrier, as hereinafter described. The second degree of rotation will also enable the rise s on cam S to throw the forked lever S' pivoted at s' to the carrier G to the position shown by dotted lines in Fig. 14 thus causing the forward end of such lever in which works a pin s² encircled by a roller sleeve s³ projecting up from slide J to draw such slide outward to a position which will place the channel j in line with the end of the channel k² through which the continuous strand is fed, and also allow a clear way for the movement of the awl H.

The third degree of rotation brings the wedge piece M into play, such wedge up to this time remaining in the position, as before mentioned, to be moved inwardly, as soon as the cam piece W in its rotation allows the slide M' to be thrown inward by the spring m' this now taking place and the wedge piece M being forced inwardly through the open space between the forward end of the lever L³ and the bottom edge of the slot l for a distance dependent upon the length of such opening which is determined by the thickness of the stock on the horn with the consequent extent of downward movement of the presser foot to reach same. If the stock be thicker the presser foot of course will not fall so far. The space between the end of the lever L³ and the bottom of the slot l will therefore be diminished and a consequently less degree of inward movement of the wedge piece allowed, while if the stock is thinner the presser foot will fall farther, such space will be extended and the wedge piece be allowed to move through same for a greater distance. As will be easily seen, any such automatic adjustment as has been described in connection with the presser foot must necessitate a corresponding adjustment in the throw of the loop inserter and the position of the awl and this is secured by transmitting the variation through the screw L⁷, the rack M³, pinion M⁴, shaft M⁵ and screw M⁷ (located in the sliding bar D') and connections between them.

The operation of the parts acting in connection with the screw L⁷ for allowing the adjustment of the horizontal awl by such screw and which consist of pinion g¹¹, on shaft M⁵, slide g⁷, g⁸ and pusher G⁴ acting upon the carrier G for such awl, consists simply in elevating the carrier and awl at the required times to a point (shown in chain lines in Fig. 10) above its working position so that the screw L⁷ in descending with the presser foot will always press the carrier to the proper working position (shown in dotted lines Fig. 10) this elevation being the result of the movement of lever g⁵ the forward end of which bears through the wedge portion g⁷ upon the pusher G⁴. In order that the operating strength or tension of the spring g¹² of the pusher G⁴ may always remain the same whether it supports the carrier at a higher or lower point, the pusher has its working position adjusted relatively to the carrier by the movement of the wedge shaped rack slide g⁷, g⁸ beneath it as may be determined by the rotation of the shaft M⁵ through the movement of the wedge M, rack slide M' and pinion M⁴, the movement of the wedge g⁸ determining the working position, so to say of the pusher, with the result that the awl is held steadily in its working position relatively to the presser foot.

The action of the wedge pieces M and g⁸ relatively to each other is such that as the wedge M interposes its wider portion as in the case of the presser foot moving downward to reach thinner stock, the wedge piece g⁸ interposes its narrower part to secure a correspondingly lower working position of the carrier G and with it the awl H.

The operation of the parts, for regulating the upward thrust of the loop inserter, which, including the wedge piece M, the sliding rack M′, pinion M⁴, and shaft M⁵ also forming part of the awl regulating mechanism, consist of pinion M⁶ on the lower end of such shaft, toothed rack M⁸, teeth $m^{10}$ on the lower part of screw M⁷ and such screw, working in and carried by the sliding bar D′ may be thus described.

Figure 24:
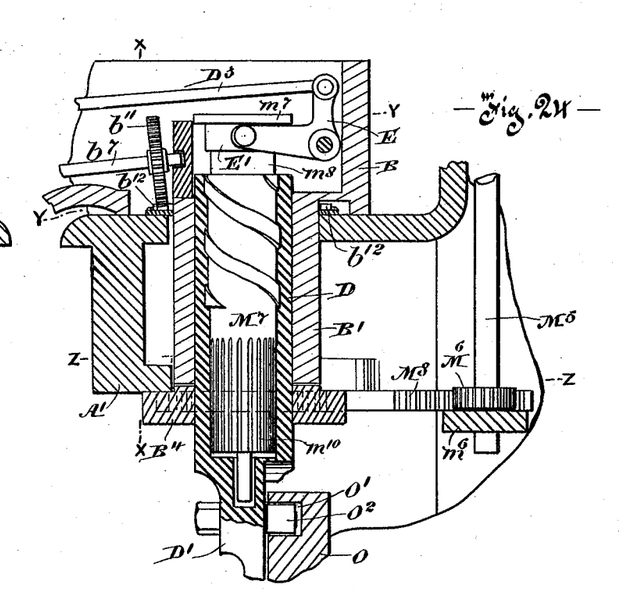
Fig. 24 is a detail vertical section of portions of operating mechanism and adjusting mechanism for varying thicknesses of material.
Figure 25:
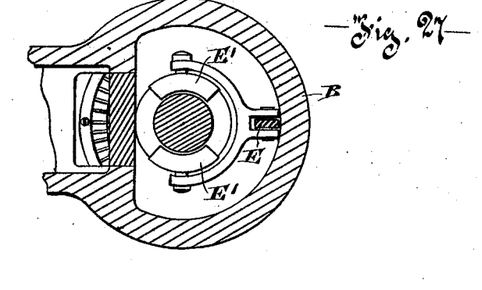
Figure 26:
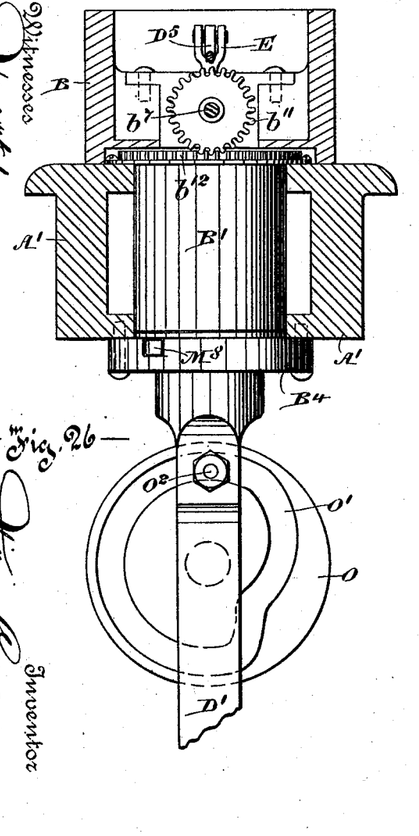
Fig. 26 is a vertical section on line *x x* Fig. 24.
Figure 30:
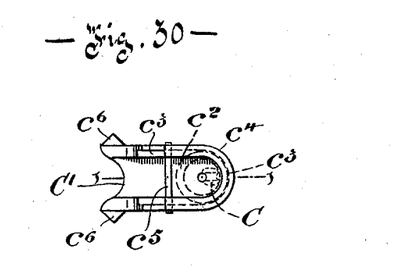
Figure 31:
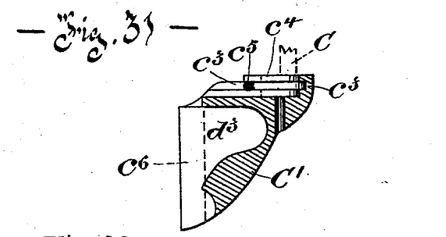
Figure 32:
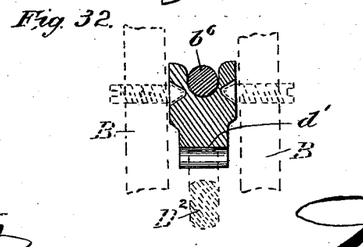

Before explaining the particular operation of screw M⁷, it will be best to point out that the sliding bar D′ has an inverted vertical throw, or, to be more exact, a vertical drop, as it is by the falling of the roller O² carried by it, into the "fall" in the groove O′ in the face of disk O (shown in Fig. 26) and the consequent downward movement of the bar that the upward movement of the loop-inserter is effected. The bell-crank lever E in Fig. 24 is shown in its normal position, the collar segments E′ thereof being at the top of neck $m^8$ and in contact with head $m^7$ of screw M⁷ carried in the sliding bar D′ which head is required to depress such horizontal arms of the lever E.

The rotation of the pinion M⁶ through the rotation of the shaft M⁵ by the sliding rack M′ and pinion M⁴ as before described in connection with the regulation of the awl H, transmits through the rack M⁸ and teeth $m^{10}$, rotary motion to the screw M⁷. Now before the rise of the loop-inserter takes place the proper adjustment is communicated to the screw M⁷ through the means mentioned, and this consists in increasing the distance between the head of the screw and the collar segments of the lever E by rotating the screw in one direction and so raising it as the material may become thinner and a short throw of the loop-inserter C be required, as it will easily be seen that if during the downward movement of bar D′ no portion of such motion is lost to the lever E, as will be the case in uniting the thickest material, the loop-inserter will be raised to its highest point. This regulating of the extent of the upward thrust of the loop inserter takes place simultaneously with the regulation of the awl H.

During the second, third, fourth, fifth and a portion of the sixth degrees of rotation, the sliding bar D′ has been drawn down and with it the head of screw M⁷ which latter as before mentioned, is in contact with the segments E′ of the bell crank lever E and through it imparted the necessary upward movement to the loop inserter C through the intermediate bell crank lever rod and other connections, the thrust being completed only upon about half of the sixth degree of rotation, the loop inserter being sufficiently withdrawn from the stock upon the sixth degree to allow the awl H to be inserted, the operation of which awl will now be described; also upon the sixth degree of rotation the downward projection $q$ on the under side of cam Q depresses the inner end of lever $g^5$, causing its outer end to raise the carrier G through the wedge piece $g^7$ and pusher G⁴ to its proper working position as will have been determined by such wedge piece $g^7$ before described, after which and upon a quarter of the rotation of the seventh degree the high rise $p'$ in the peripheral groove $p$ of cam roller P, acting on the end of lever P², carrying roller P⁴ will cause the vertical arm of such lever to be thrown forward the distance indicated by axial line I, and so drive the cross-head H′ forward and the awl through the loop of the stitch that has been formed by the loop-inserter and the remaining rotation of the seventh degree withdrawing it.

During the eighth degree the feed foot $g^3$ is drawn inward by the rise $r$ of cam R bearing against the arm $r^6$ of the curved lever R′ thus drawing backward the sliding bar R² and with it the feed foot $g^3$ out of contact with the stock.

The rotation during the ninth degree will, by means of the rise $q'$ of cam Q (shown in Fig. 13) move the forked end of the lever Q² to the chain line position shown, and the spring-bolt Q³ projecting from the opposite end of same in contact with ratchet K⁶, will rotate same a single step and cause disk K to feed the strand of wire held between it and K′ along channel K² and into channel $j$ in the slide J.

The rotation during the tenth degree causes the lateral movement of the feed foot $g^3$ back to its normal position this being effected through the rise $t$ on cam T throwing the forked lever T′ back to its normal position shown in full lines Fig. 15. The rotation during the tenth degree will also cause rise $s$ on cam S to throw slide J back to its original position, with channel $j$ in line with perforation $g$, and by so doing sever the length of wire that has been fed into channel $j$, and so locate it in the path of the awl which, during the twelfth degree of rotation, is, by means of the lower rise $p^2$ of cam-roller P throwing the vertical arm of lever P² the distance indicated by axial line 2, caused to drive forward the piece of wire in front of it and locate it in the loop, thus locking the loop, its return taking place upon the thirteenth degree.

At the termination of the thirteenth degree of rotation the cam piece W comes in contact with the bearing surface M² of the slide M′ and its subsequent action tends to throw outward the wedge piece M to its normal position shown in Fig. 16.

At the completion of the fourteenth degree the downward projection $q$ on the under side of cam Q clears the inner end of lever $g^5$ thereby making it possible for the carrier to be pushed down to its normal position as will be presently mentioned.

At the fifteenth degree the position of the wedge piece M relatively to the presser foot, and the lever L³ is such that the presser foot can be raised to its fullest extent by the upward movement of the forward end of lever L³ which takes place during the remaining rotation of the fifteenth degree, this operation of the lever being caused by the fall in the peripheral groove V' of cam roller V.

The sixteenth degree suffices, through the rise $u$ on the under side of cam roller V, bearing on the spring projection $u'$ on the upper side of lever T', to depress the carrier G thus completing a full cycle of operation.

In connection with the feeding of the stock I arrange an adjustable block $t'$ in a groove $t^2$ as shown in lever S' (Fig. 14) in the inner face of the arm $T^2$ of the forked end of lever T', such block being pivoted at $t^3$ near one end and being adjustable by means of the set screw $t^4$, provided with jam nut $t^5$, for the purpose of regulating the extent of throw of the outer end of such lever which operates the feed foot $g^3$, and thereby shortening or lengthening the stitch.

Adjustable devices similar to those just described are preferably introduced in the forked ends of other levers of the machine for the purpose of taking up the wear of such parts.

It will be readily apparent that while I have described my machine with the automatic regulating mechanism in combination therewith, in all cases where a machine is required for operating upon stock of a regular thickness throughout such regulating mechanism could be dispensed with.

What I claim is as follows:

1. In a machine for uniting the soles and uppers of boots and shoes having a combined awl and nail driver a swinging work-supporting horn and a loop inserter carried by the horn, the awl and loop inserter acting in unison and the loop inserter having a true horizontal annular movable connection with its operating part, and means for holding the loop inserter laterally in position during its vertical movement.

2. In a machine for uniting the soles and uppers of boots and shoes having a swinging work supporting horn, and a loop-inserter carried by same and the loop inserter having a true horizontal annular movable connection with its operating part therein through a circular flange and groove connection with horizontal upper and lower surfaces,—the combination with such loop-inserter, of a disk carried in the nose of such horn having a slot corresponding to the shape in cross section of such loop-inserter, through which slot the loop inserter works, and means for imparting to such disk a reverse movement to that of the horn for the purpose described.

3. In a machine for uniting the soles and uppers of boots and shoes, the combination of the loop inserter having a flat circular flange at its base, and its operating cross head or carrier having a recess partially surrounded by a flanged wall to form a groove to receive the base and flange of the loop inserter for the purpose set forth.

4. The combination of top plate $a'$, integral slide F, hinged carrier G G', pivoted to same, and means directly connected with said slide for adjusting same as an entirety in opposite directions, all substantially as shown and described.

5. The combination of a top plate $a'$, slide F, hinged carrier G G' pivoted to same, pusher $G^4$, automatically operated lever mechanism for supporting and positively operating such pusher, and cam operated means for depressing such carrier, as shown and for the purpose described.

6. The combination with the presser-foot bar, the loop-inserter, wedge-piece M, slide M' having toothed rack at one end of same, adjustable pin $m^3$, and the spring $m'$ arranged externally of such slide for operating the same, of sliding bar D', screw $M^7$ connections between same and loop-inserter, and connections comprising pinion $M^4$, shaft $M^5$ pinion $M^6$, rack slide $M^8$ and gear teeth $m^{10}$ on screw $M^7$ between said slide M' and such screw $M^7$ for rotating the latter, all substantially as shown and described, and for the purpose set forth.

7. The combination, with head-section $A^4$, slide M' having projection $m^2$, means for holding such slide in place, and cam W; of adjustable pin $m^3$ and spring $m'$ encircling said pin as herein set forth, for the purpose described.

8. The combination of shaft $N^3$, cams S and Q, carrier-section G, slide J, having single aperture $j$, levers S' and $Q^2$ pivoted to such carrier-section and the latter having spring operated bolt $Q^3$, ratchet $K^6$, disks K K', and combined awl and nail-driver H, all as herein set forth and for the purposes described.

9. In a machine for uniting the soles and uppers of boots and shoes, the combination with a work support, means for holding the work in place, and stitch forming mechanism comprising a loop inserter and combined awl and nail driver with their carrying parts, of a separate feed foot having a four-way movement independently of any movement of said carrying parts, and means for imparting such movement to same.

10. In a machine for uniting the soles and uppers of boots and shoes, the combination with a work support, means for holding the work in place, a loop inserter and a combined awl and nail driver, of a carrier for such combined awl and nail driver which is stationary during the feeding of the stock and a feed foot having a four-way movement, and means for imparting such movement to same.

11. The combination with the combined awl and nail driver, of horizontal carrier G having suitable guideways formed in it for the sliding crosshead of said combined awl and nail driver, feed foot $g^3$ carried by said carrier but having a four-way movement independently of same, and cam-lever-and-sliding-bar-mechanism for imparting such movement to said feed foot.

12. The combination with the combined awl and nail driver, of horizontal carrier G having suitable guideways formed in it for the sliding crosshead of said combined awl and nail driver, feed foot $g^3$, cams R and T, levers R' and T' and sliding bar $R^2$ for the purposes set forth.

13. In combination with the feed foot, the combined awl and nail driver and the carrier for the latter, a slide to which it is connected, and the stationary framing of the machine at the rear of such carrier, an adjusting bolt projecting through such framing, and connected with such slide whereby the carrier can be adjusted forward or backward for the purpose set forth.

14. In combination with the feed foot, the combined awl and nail driver and the carrier for the latter, a slide to which it is connected, and the stationary framing of the machine at the rear of such carrier, the adjusting bolt $F^2$, projecting through such framing rotatable therein but held against longitudinal movement and connected with such carrier through said slide, substantially as described, and for the purposes set forth.

15. The combination with the stationary framing of the machine having an opening through it and an annular recess concentric with such opening and carrier sections G G' hinged to each other, of slide F and adjusting bolt $F^2$ having a screw threaded connection with said slide and an annular enlargement to fit the recess in said framing, for the purpose set forth.

16. The combination with the stationary framing of the machine having an opening through it and an annular recess concentric with said opening and carrier sections G G' of adjustable slide F adjusting bolt $F^2$ having a screw threaded connection with said slide and an annular enlargement to fit the recess in said framing and set screw $F^3$ for the purpose set forth.

17. The loop inserter having a perforated base and an inserting portion proper, the latter being oval in cross section and grooved down the sides formed by the ends of the oval, as shown and described.

18. The loop inserter having a perforated base and an inserting portion the sides of which inserting portion are grooved, the groove on one side being directly in line with the perforation in the base.

19. The loop inserter with circular base, inserting portion proper carried eccentrically by said base, and an opening through such base for the purpose set forth.

20. In combination with the swinging horn or work support, the loop inserter carried by same and provided with circular base having an upwardly projecting loop inserting portion proper and a laterally projecting annular flange in combination with a carrying and operating cross head in said horn having an annularly shaped groove to receive such flange for the purpose set forth.

21. In combination with the swinging horn or work support the loop inserter carried by same and provided with circular base having a central opening, an upwardly projecting loop inserting portion proper and a laterally projecting annular flange in combination with a carrying and operating cross head in said horn having an annularly shaped groove to receive such flange for the purpose set forth.

22. In combination with the swinging horn or work support the loop inserter carried by same and provided with circular base having a central opening, a laterally projecting annular flange and an upwardly projecting loop inserting portion proper arranged eccentrically of such base to one side of said opening in combination with a carrying and operating cross head in said horn having an annularly shaped groove to receive such flange.

23. In combination with the swinging horn or work support, the loop inserter carried by same and provided with inserting portion of oblong form, oval in cross section, grooved down the sides formed by the ends of the oval and having a circular base with central perforation, and projecting annular flange, and such inserting portion arranged eccentrically of said circular base in combination with a carrying and operating cross head in said horn having an annularly shaped groove to receive such flange.

24. The loop inserter having an inserting portion proper the body of which is of oblong form, oval in cross section, and grooved down the sides formed by the ends of the oval for the purpose set forth.

25. The combination of the movable carrier or cross head for the loop inserter, having a wall extending partially around its top surface and such wall grooved on its inner side; of the loop inserter having a laterally projecting flange on its base freely fitting such groove, with means for preventing any lateral displacement of such loop inserter when in place.

26. The combination of the movable carrier or cross head for the loop inserter, having a wall extending partially around its top surface and such wall grooved on its inner side; of the loop inserter having a laterally projecting flange on its base freely fitting such groove, and a pin extending across the opening left in such wall for the purpose set forth.

27. In combination with the nose of the horn, and the reciprocating cross head therein having V-shaped projections down its sides, adjustable guides $C^2$ fitting recesses in the horn and having V-shaped grooves in their faces to receive the V-shaped projections of the cross head, and adjusting screws $c^7$ passing through the sides of the horn and bearing against such guides as and for the purposes set forth.

28. The combination with the nose of the horn of shaft $b^6$, and segment $d'$ axially mounted in the nose and hollowed on its upper surface to form a bearing for the upper end of such shaft.

29. In combination with the presser foot bar L and a fixed part or bearing; of an adjustable screw of fine pitch for regulating the adjustment of the presser foot bar as to its working length and a second screw of greater pitch having the extent of its movement set or determined by suitable stops and adapted by its rotation in opposite directions to raise or lower said presser foot a uniform distance.

30. The combination with the presser foot bar L and slide $L^2$ carried thereby, of male adjusting screw $L^5$ connected with such slide and female screw $L^6$, in which such male screw is threaded, the female screw working through the upper portion of the bar L, for the purposes set forth.

31. The combination with the presser foot bar L and slide $L^2$ carried thereby of male adjusting screw $L^5$ connected with such slide and female screw $L^6$ in which such male screw is threaded, the female screw working through the upper portion of the bar L, and the respective lock nuts $l^2$ $l^3$ for the purpose set forth.

32. The combination with the presser foot bar L and slide $L^2$ carried thereby, of male adjusting screw $L^5$ connected with such slide, female screw $L^6$ in which such male screw is threaded, the female screw working through the upper portion of the bar L, and handle $l^5$ adjustably secured upon said female screw, as set forth.

33. The combination, with the presser foot bar L and slide $L^2$ carried thereby, of male adjusting screw $L^5$ connected with such slide, female screw $L^6$ in which such male screw is threaded, the female screw working through the upper portion of the bar L, handle $l^9$ and jam nuts $l^2$, $l^3$, $l^4$, $l^6$ for the purpose set forth.

34. The combination of carrier G, shaft $N^3$, cam Q having downward projection $q$, lever $g^5$ suitably pivoted, combined rack and wedge slide $g^7$ $g^8$ suitably supported, pusher $G^4$, shaft $M^5$ and pinion $g^{11}$ as and for the purpose set forth.

35. The combination with carrier G, of a spring pusher or cushion beneath same, and automatically operated lever mechanism for supporting and operating said pusher for the purpose set forth.

36. The combination with the adjustable carrier for the combined awl and nail driver, of a positive and invariable lever mechanism for lifting same, and intermediate regulating mechanism for the purpose set forth.

37. The combination with the adjustable carrier, for the combined awl and nail driver, of lifting mechanism for same, an intermediate regulating mechanism in the form of a movable wedge piece, and means for operating same.

38. The combination of the machine head, the presser foot bar L, slide $L^2$ having opening $z$, lever $L^3$, wedge piece M, wedge piece $g^7$, intermediate operating connections between both wedge pieces, pusher $G^4$, carrier G, lifting lever $g^5$ bearing beneath said wedge piece $g^7$, and means for operating such lever.

39. The combination of the machine head, the presser foot bar L, slide $L^2$ having opening $l$, lever $L^3$, wedge piece M, slide $M'$, spring $m'$, localizing pin $m^3$, rack $M^3$ on said slide, pinion $M^4$, shaft $M^5$, pinion $g^{11}$, toothed slide $g^9$, and wedge piece $g^7$, pusher $G^4$, awl carrier G and means for elevating said wedge piece $g^7$, and, through it and said pusher, the awl carrier, all combined and operating substantially as and for the purposes set forth.

WILLIAM CAREY.

Witnesses:
 WILL P. McFEAT,
 R. ALE. KIMBLE.